US005897178A

United States Patent [19]
Ohara

[11] Patent Number: 5,897,178
[45] Date of Patent: Apr. 27, 1999

[54] COMPUTER HOUSING MOUNTING SYSTEM

[76] Inventor: Takeyoshi Ohara, 2-1, 102, 2978-6, Sugeda-Cho, Kanagawa Ku, Yokohama City, Japan

[21] Appl. No.: 09/098,247

[22] Filed: Jun. 17, 1998

[51] Int. Cl.[6] .................. A47B 81/00; G06F 1/16
[52] U.S. Cl. .................. 312/223.2; 312/334.4; 312/330.1; 312/194; 361/686; 361/725
[58] Field of Search .................. 312/223.1, 223.2, 312/330.1, 334.4, 334.1, 348.2, 194; 361/724, 725, 726, 727, 683, 684, 686

[56] References Cited

U.S. PATENT DOCUMENTS

| | | | |
|---|---|---|---|
| 4,766,422 | 8/1988 | Wolters et al. | 312/194 X |
| 4,964,017 | 10/1990 | Jindrick et al. | 361/390 |
| 4,983,000 | 1/1991 | Rock | 312/334.4 X |
| 5,197,789 | 3/1993 | Lin | 312/223.2 |
| 5,552,959 | 9/1996 | Penniman et al. | 361/686 |
| 5,571,256 | 11/1996 | Good et al. | 312/223.1 X |
| 5,713,647 | 2/1998 | Kim | 312/223.2 |
| 5,761,033 | 6/1998 | Wilhelm | 361/686 |

*Primary Examiner*—Peter M. Cuomo
*Assistant Examiner*—James O. Hansen
*Attorney, Agent, or Firm*—Pro-Techtor Inter-National Services

[57] ABSTRACT

A drawer type computer housing mounting system including a computer housing formed of a bottom shell, a top cover shell and a face panel, and two sliding rails fastened to two opposite vertical side panels of the bottom shell of the computer housing for permitting it to be moved between two sliding tracks in a desk, wherein the sliding rails each have a first wall and a second wall connected at right angles, and a plurality of mounting holes at the first wall and the second wall for connection to the two opposite vertical side panels of the bottom shell of the computer housing by fastening devices, the first wall and the second wall having different widths so that the sliding rails can be alternatively fastened to the computer housing between two positions to fit the pitch between the sliding tracks in the desk; the vertical side panels of the bottom shell each have a plurality of vertical sliding slots to which the sliding rails are adjustably fastened by fastening devices at the desired elevation.

1 Claim, 9 Drawing Sheets

COMPUTER HOUSING MOUNTING SYSTEM

BACKGROUND OF THE INVENTION

The present invention relates to a computer housing mounting system made to slide in and out of a computer desk, and more particularly to such a computer housing mounting system which can be adjusted to fit any of a variety of computer desks.

FIG. 1 shows a drawer type computer housing mounting system made to slide in and out of a computer desk. This structure of drawer type computer housing mounting system is designed to fit a particular computer desk only, therefore it cannot be used in a different size of computer desk.

FIG. 1—1 shows another structure of drawer type computer housing mounting system according to the prior art. According to this design, the top cover shell 11' of the computer housing has oblique sliding holes 111' for mounting the sliding rails 3', and locating holes 112' in which sliding clamps 13' are installed and clamped on the sliding rails 3'. This drawer type computer housing mounting system still has drawbacks. One drawback of this structure of drawer type computer housing mounting system is its complicated installation procedure. If the position of the sliding rails 3' does not fit the tracks in the desk, the whole assembly of the computer housing mounting system must be taken out of the computer desk, and then the position of the sliding rails 3' must be adjust ed against. Several trials may be required before the position of the sliding rails 3' is well set. Another drawback of this structure of drawer type computer housing mounting system is that the elevation of the sliding rails 3' is adjusted relative to the top cover shell 11' step by step (from one section to another in the each oblique sliding hole 111'). Still another drawback of this structure of drawer type computer housing mounting system is the complicated mounting arrangement between the vertical side panels of the top cover shell 11' and the rails 3'. Because of the use of the sliding clamps 13' and the design of the oblique sliding holes 111' and the locating holes 112', the installation of the rails 3' is complicated.

SUMMARY OF THE INVENTION

The present invention eliminates the aforesaid disadvantages. According to one aspect of the present invention, the computer housing mounting system is comprised of a housing which is formed of a bottom shell, a top cover shell covered on the bottom shell, two sliding rails fastened to two opposite vertical side panels of the bottom shell for permitting it to be moved between two sliding tracks in a desk, wherein the sliding rails each have a first wall and a second wall connected at right angles, and a plurality of mounting holes at the first wall and the second wall for connection to the two opposite vertical side panels of the bottom shell of the computer housing by fastening devices. The first wall and the second wall have different widths so that the sliding rails can be fastened to the computer housing alternatively between two positions to fit the pitch between the sliding tracks in the desk. According to another aspect of the present invention, vertical side panels of the bottom shell each have a plurality of vertical sliding slots to which the sliding rails are adjustably fastened by fastening devices at the desired elevation. According to still another aspect of the present invention, the fastening devices each are comprised of a male screw member and a female screw member threaded onto the male screw member. The female screw member can be conveniently turned with the hand. According to still another aspect of the present invention, an attachment panel is fastened to the rear side of the bottom shell for keeping electrical cables in good order.

BRIEF DESCRIPTION OF THE DRAWINGS

FIG. 1—1 is an exploded view of another structure of drawer type computer housing mounting system according to the prior art.

DETAILED DESCRIPTION OF THE PREFERRED EMBODIMENT

Figure 1:
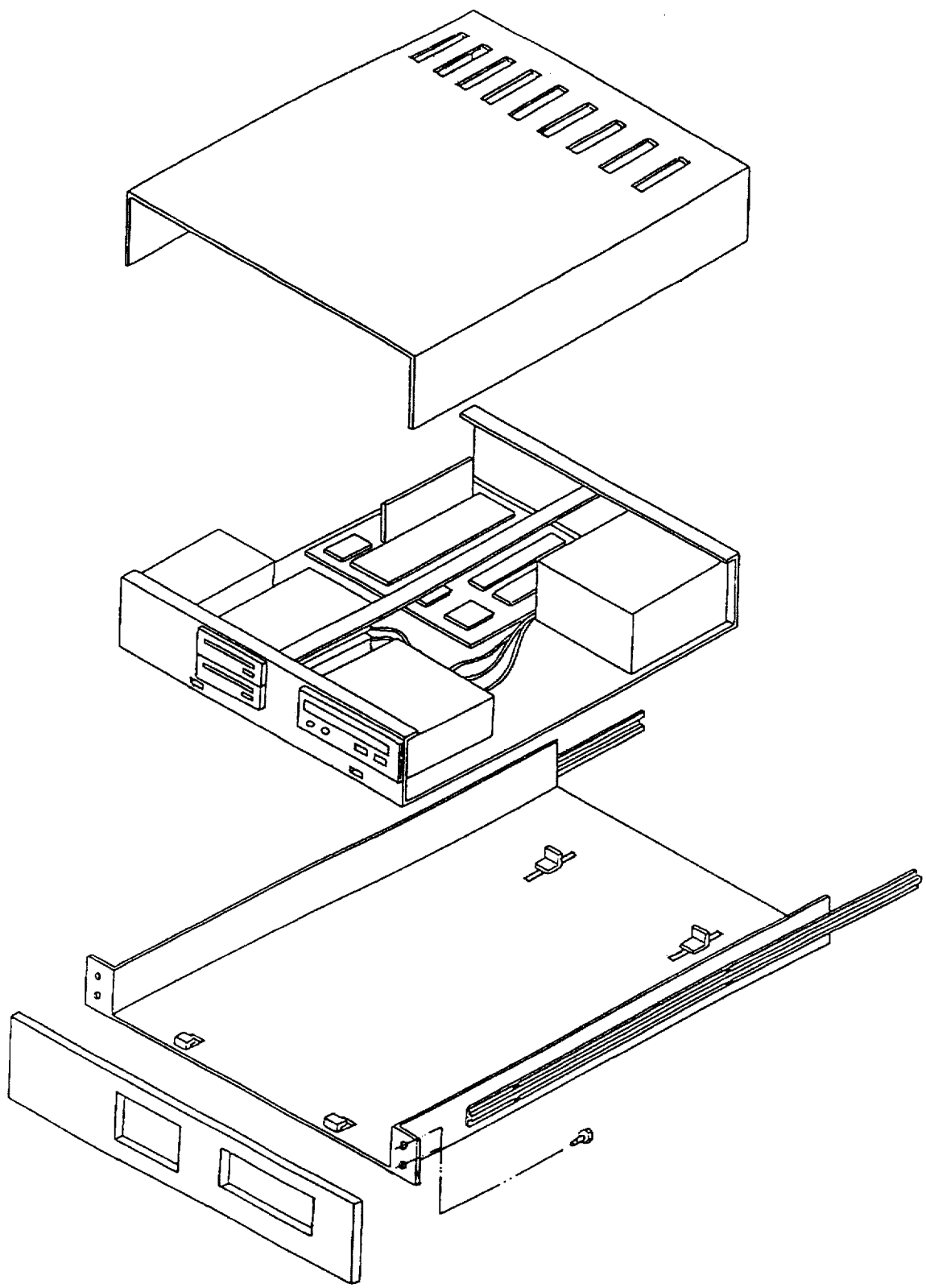
FIG. 1 is an exploded view of a drawer type computer housing mounting system according to the prior art.
Figure 1:
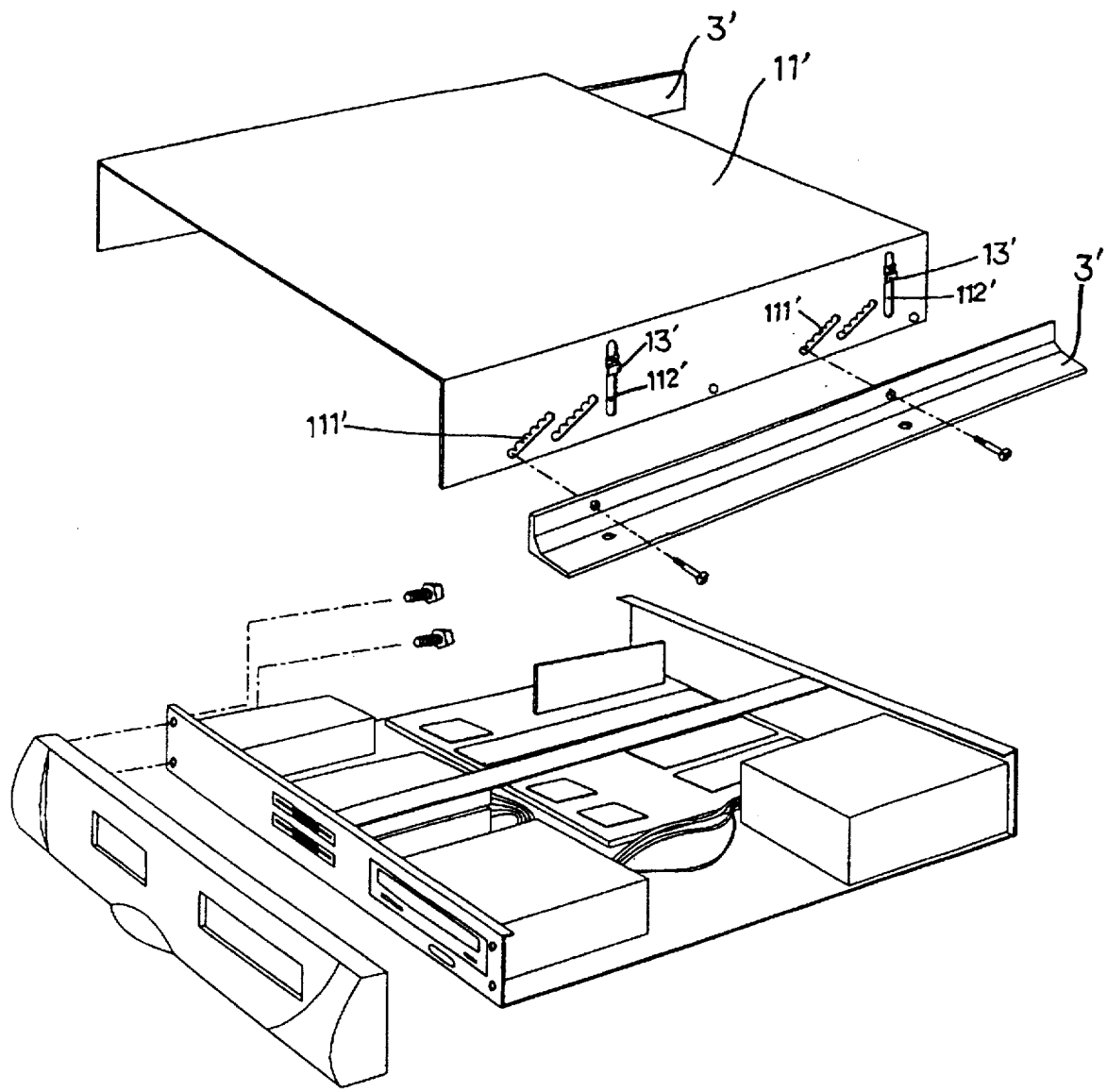
Figure 2:
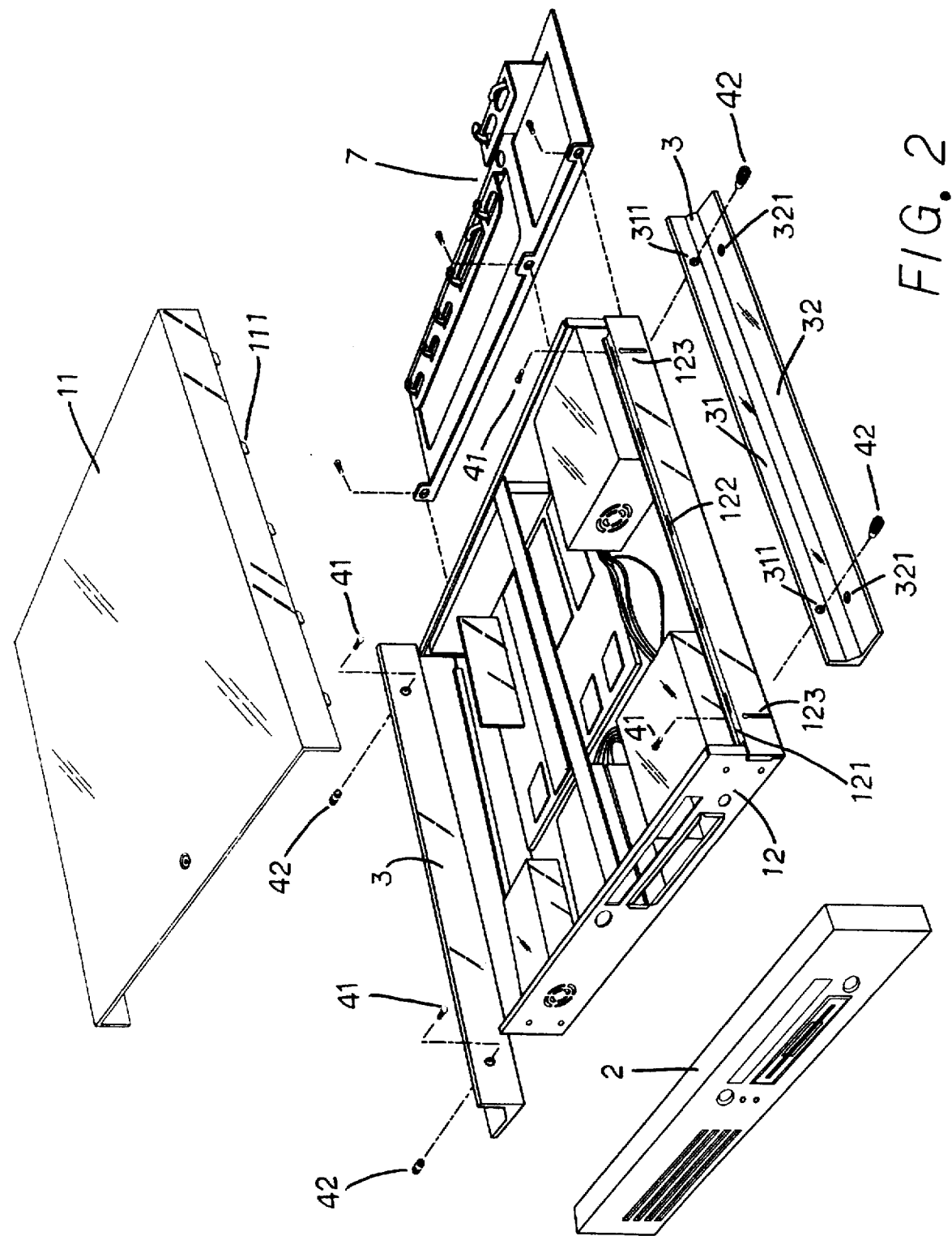
FIG. 2 is an exploded view of a computer housing mounting system according to the present invention.
Figure 3:
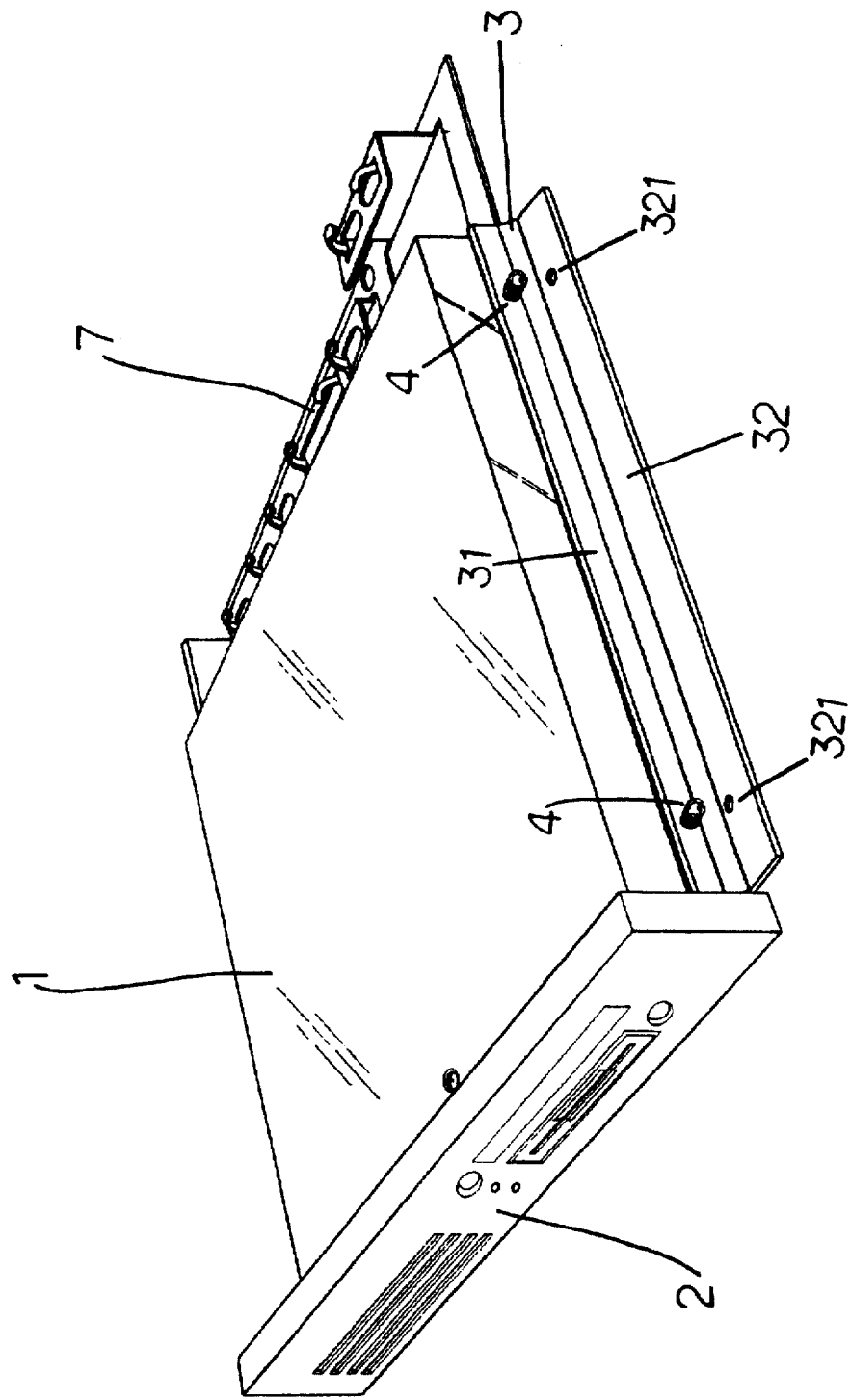
FIG. 3 is an elevational view of the present invention, showing the computer housing mounting system assembled.

Referring to FIGS. 2 and 3, the present invention comprises a computer housing 1, a face panel 2, two sliding rails 3, and a plurality of fastening devices 4.

Figure 4:
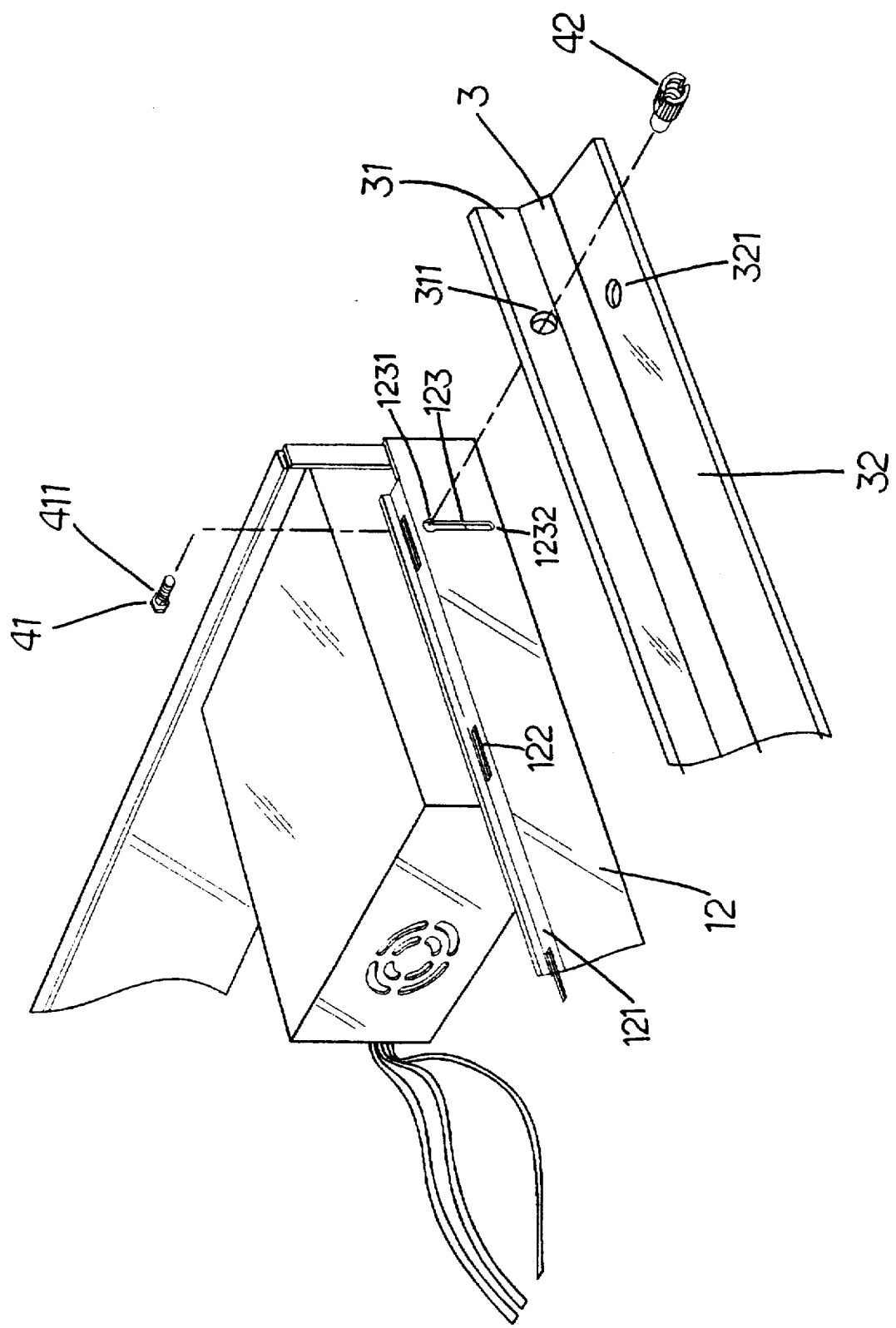
FIG. 4 is an enlarged view of a part of FIG. 2.

Referring to FIG. 4 and FIGS. 2 and 3 again, the computer housing 1 is comprised of a bottom shell 12, and a top cover shell 11 for covering the bottom shell 12. The top cover shell 11 comprises a plurality of downward hooks 111 respectively symmetrically extended from two opposite vertical side walls thereof for connection to the bottom shell 12. The bottom shell 12 comprises two outward flanges 121 respectively outwardly raised from two opposite vertical side walls thereof at the top, a plurality of hook holes 122 respectively symmetrically formed at the outward flanges 121 for receiving the downward hooks 111 of the top cover shell 11, and a plurality of vertical sliding slots 123 respectively symmetrically provided at the two opposite vertical side walls. The vertical sliding slots 123 each are comprised of an elongated narrow portion 1232, and an expanded circular portion 1231 at one end, namely, the top end of the elongated narrow portion 1322. The face panel 2 is fastened to the front side wall of the bottom shell 12 of the computer housing 1 by screws. The sliding rails 3 have a substantially L-shaped cross section, and are respectively fastened to the two opposite vertical side walls of the bottom shell 12 of the computer housing 1. Each sliding rail 3 comprises a first wall 31 and a second wall 32 connected at right angles. The walls 31 and 32 have different widths. Mounting holes 311 and 312 are respectively provided at the walls 31 and 32 for connection to the sliding slots 123 by the fastening devices 4. The fastening devices 4 each are comprised of a headed male screw member 41 and a female screw member 42. The headed male screw member 41 has a threaded shank 411 onto which the female screw member 42 is threaded. The diameter of the threaded shank 411 of the headed male screw member 41 is approximately equal to the width of the elongated narrow portion 1232. When the threaded shank 411 of the headed male screw member 41 of one fastening device 4.

Figure 5:
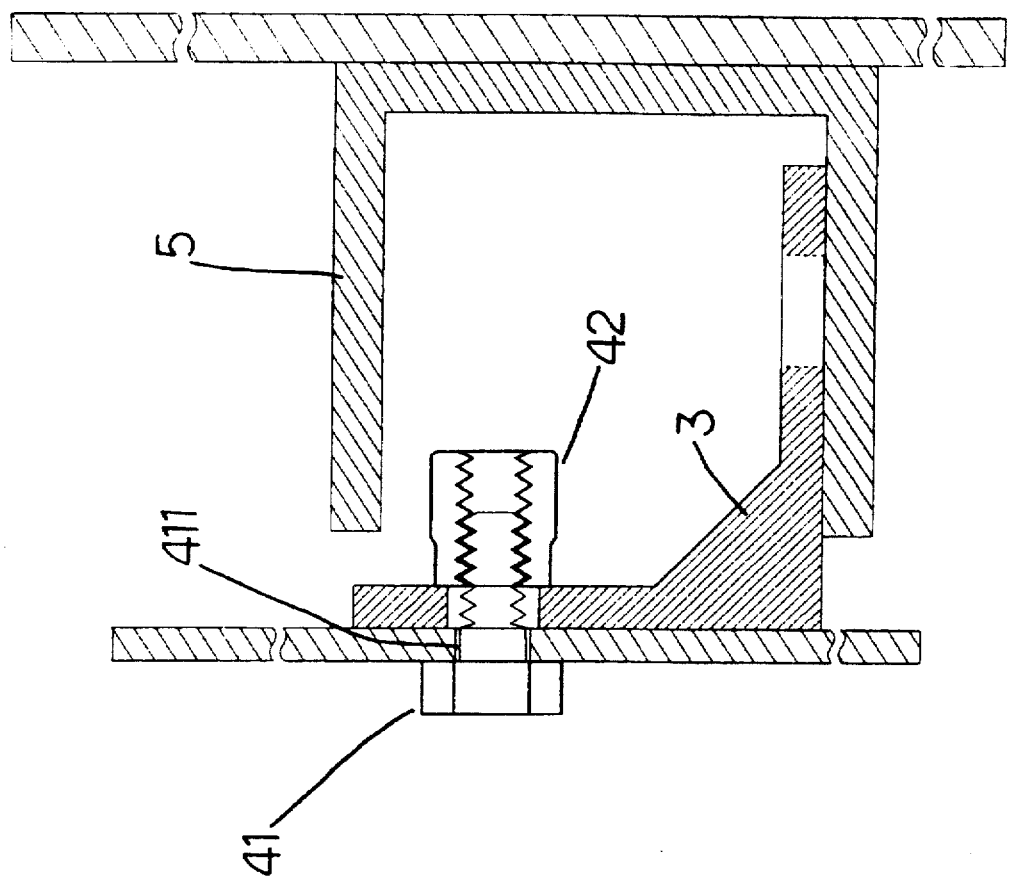
FIG. 5 is a cross sectional view showing the present invention installed in the desk.

Referring to FIG. 5 and FIG. 4 again, the first walls 31 of the sliding rails 3 are fastened to the sliding slots 123 at the two opposite vertical side walls of the bottom shell 12 of the computer housing 1 at the desired elevation by the fastening devices 4, so as to fit the sliding tracks 5 in the desk, enabling the second walls 32 of the sliding rails 3 to be slidably supported on the sliding tracks 5. Alternatively, the second walls 31 of the sliding rails 3 can be fastened to the sliding slots 123 at the two opposite vertical side walls of the bottom shell 12 of the computer housing 1 at the desired elevation by the fastening devices 4, enabling the first walls 31 of the sliding rails 3 to be slidably supported on the sliding tracks 5. By loosening the female screw members 42 from the respective male screw members 41, the sliding rails 3 and the loosened fastening devices 4 can be adjusted vertically along the vertical sliding slots 123 to the desired elevation. After adjustment, the male screw members 41 and the female screw members 42 are respectively fastened up again.

Figure 6:
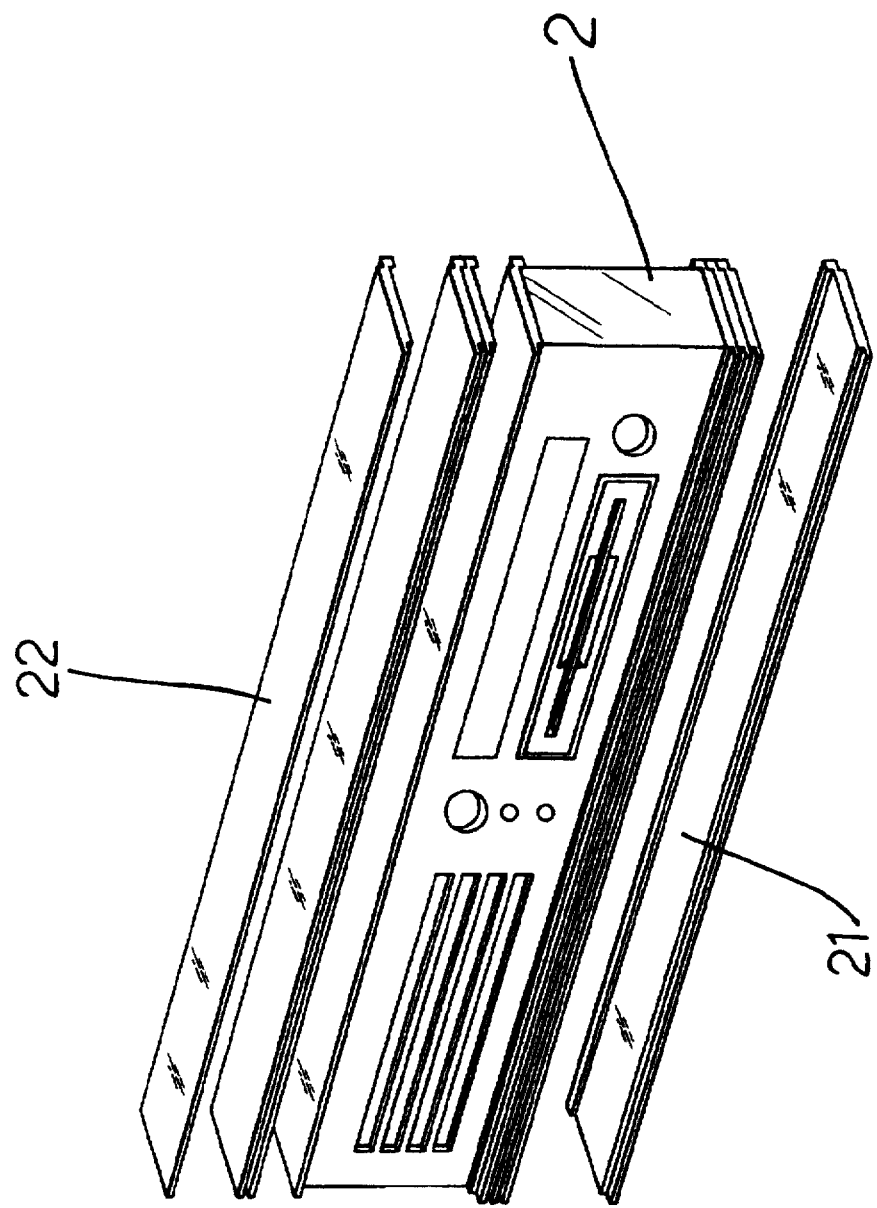
FIG. 6 shows the face panel decorated with ornamental sheets at top and bottom sides according to the present invention.
Figure 8:
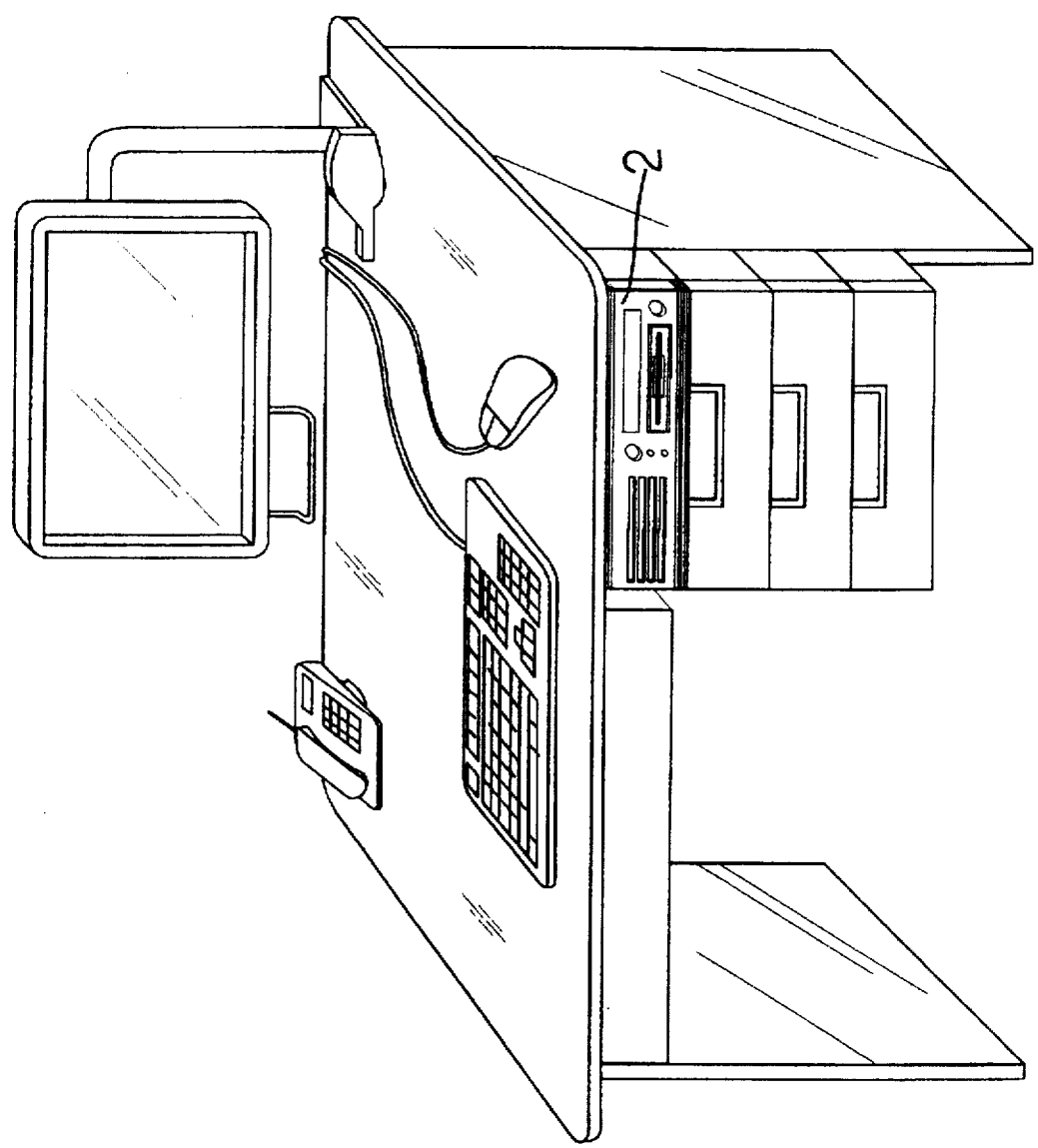
FIG. 8 shows the present invention installed in a computer deck.

Referring to FIGS. 6 and 8, stacks of ornamental sheets 21 and 22 may be adhered to top and bottom sides of the face panel 2 subject to the gaps in the desk.

Figure 7:
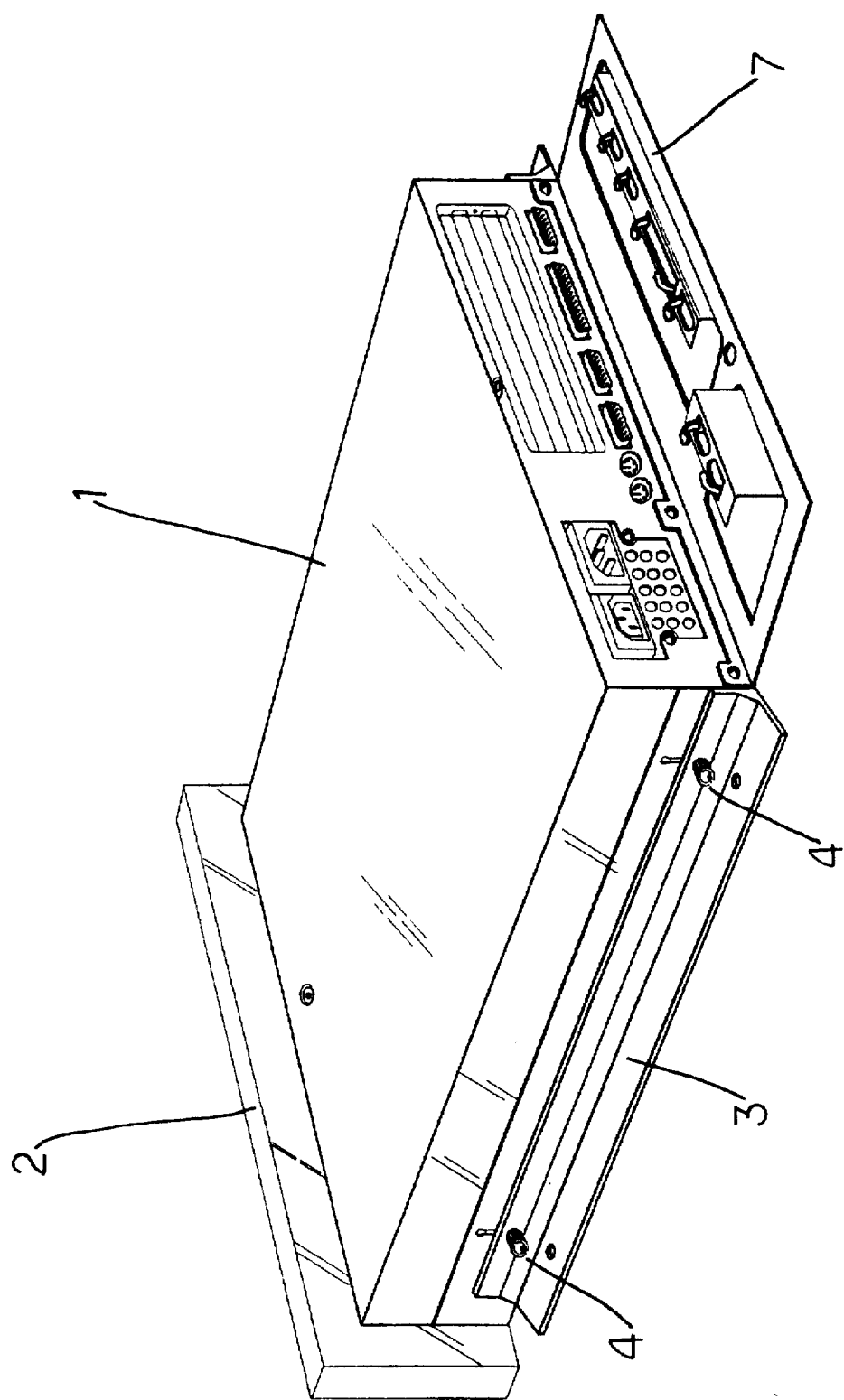
FIG. 7 is an elevational view of the present invention taken from another angle.

Referring to FIG. 7 and FIGS. 2 and 3 again, an attachment panel 7 is fixedly fastened to the vertical rear side wall of the bottom shell 12 of the computer housing 1 for keeping electrical cables in good order.

What the invention claimed is:

1. A computer housing mounting system comprising a bottom shell, a top cover shell covered on said bottom shell at a top side, said bottom shell having two vertical side panels, a vertical front panel and a vertical rear panel, a face panel fastened to the vertical front panel of said bottom shell, two sliding rails respectively fastened to the two opposite vertical side panels of said bottom shell, enabling said bottom shell to be moved in and out of a desk between two sliding tracks inside said desk, and a plurality of fastening devices fastened to said bottom shell and said sliding rails to fix said sliding rails to the vertical side panels of said bottom shell at the desired elevation, wherein the vertical side panels of said bottom shell each comprise an outward flange at a top side, a plurality of hook holes respectively formed at said outward flanges, and a plurality of vertical sliding slots, said vertical sliding slots each being comprised of an elongated narrow portion, and an expanded circular portion at one end of said elongated narrow portion; said top cover shell comprises a plurality of downward hooks respectively extended from two opposite vertical side walls thereof and forced into engagement with the hook holes on the outward flanges of the vertical side panels of said bottom shell; said sliding rails each comprise a first wall and a second wall connected at right angles, and a plurality of mounting holes at said first wall and said second wall for connection to the sliding slots on the vertical side panels of said bottom shell selectively by said fastening devices, said first wall and said second wall having different widths; said fastening devices each are comprised of a headed male screw member and a female screw member, said headed male screw member having a threaded shank onto which said female screw member is threaded, the diameter of said threaded shank of said headed male screw member being approximately equal to the width of the elongated narrow portions of said sliding slots.

* * * * *